(12) United States Patent
Pezalla (10) Patent No.: US 10,676,209 B1
(45) Date of Patent: Jun. 9, 2020

(54) SYSTEM AND METHOD FOR ENGAGING APPROPRIATE AIRCRAFT CONTROLS DURING AN ENGINE-RELATED EMERGENCY

(71) Applicant: Christian Edmund Pezalla, Daytona Beach, FL (US)

(72) Inventor: Christian Edmund Pezalla, Daytona Beach, FL (US)

( * ) Notice: Subject to any disclaimer, the term of this patent is extended or adjusted under 35 U.S.C. 154(b) by 0 days.

(21) Appl. No.: 16/501,211

(22) Filed: Mar. 8, 2019

(51) Int. Cl.
*G01C 23/00* (2006.01)
*B64D 43/00* (2006.01)
*B64D 31/04* (2006.01)
*B64D 45/00* (2006.01)

(52) U.S. Cl.
CPC ............ *B64D 43/00* (2013.01); *B64D 31/04* (2013.01); *B64D 45/00* (2013.01); *B64D 2045/009* (2013.01)

(58) Field of Classification Search
CPC ................................ B64D 43/00; B64D 31/04
USPC ................ 340/971, 514, 515, 644, 652, 653
See application file for complete search history.

(56) References Cited

U.S. PATENT DOCUMENTS

| | | | | |
|---|---|---|---|---|
| 3,668,621 A | * | 6/1972 | Boyd | G01C 5/005 340/970 |
| 4,351,394 A | * | 9/1982 | Enk | A62C 3/08 169/16 |
| 4,538,777 A | * | 9/1985 | Hall | B64D 47/00 244/1 R |
| 4,718,229 A | * | 1/1988 | Riley | F02C 7/25 60/39.281 |
| 9,697,655 B1 | * | 7/2017 | Eyhorn | G07C 5/0808 |

* cited by examiner

*Primary Examiner* — Tai T Nguyen
(74) *Attorney, Agent, or Firm* — Gina T. Constant, Esq.

(57) ABSTRACT

The present invention provides a system and method for pilot(s) to avoid engaging incorrect control(s) and/or switch(es) in the event of engine fire or mechanical malfunction, to prevent shutdown of a functioning engine. The system and method employs amber or another color lights to indicate a malfunction that the pilot may correct, such as restarting a functional engine that has ceased working. Additionally, the system and method of the present invention employs red or another color lights to indicate to the pilot(s) that a mandatory shutdown of a failed engine is required, and provides guidance to the correct controls and switches, as indicated and positively identified by the lighting system and method.

8 Claims, 9 Drawing Sheets

SYSTEM AND METHOD FOR ENGAGING APPROPRIATE AIRCRAFT CONTROLS DURING AN ENGINE-RELATED EMERGENCY

ASSOCIATED PROVISIONAL PATENT

This patent application claims priority to and benefit of U.S. Provisional Patent Application No. 62/388,868, filed on Mar. 5, 2018, each of which is incorporated by reference in its entirety.

FIELD OF THE INVENTION

The present invention generally provides a multi-engine aircraft safety system, and specifically, a system and method for engaging the appropriate aircraft controls in the event of engine fire, engine failure, or any other engine malfunction or anomaly.

BACKGROUND OF THE INVENTION

It has long been known that performance skills of an individual can degrade in highly stressful environments. This can be due to a large number of factors. Stress ordinarily produces a psychological response. Such a response creates an immediate reaction to a stressor, what is known as a "flight or fight" response. The body perceives a stressor as a threat or danger and releases stress hormones, such as adrenaline and cortisol. These hormones enable the body to perform activities beyond the range of normal ability, however these same hormones may also cause important details to be missed. During an emergency situation in an aircraft, this effect could lead to incorrect decisions being made, and therefore potentially catastrophic loss of life due to incorrect actions being taken.

A typical modern aircraft flight deck includes a primary flight display device and a combined autopilot/auto-throttle controller. The controller is mounted on the flight panel, below the windshield, in a vertical line with the primary flight display. This generally applies to larger aircraft, as many smaller aircraft still rely on a manual power/thrust control.

Basic types of flight instruments are found on virtually all aircraft, and are most often arranged in a typical manner in two rows of three. In this typical arrangement, the top central instrument is an artificial horizon. This instrument gives a pilot information that tells the pilot(s) how the aircraft is flying relative to an artificial horizon that appears on the instrument. Immediately below the artificial horizon instrument is a heading indicator, which tells the pilot what direction the aircraft is heading. To the right of the artificial horizon is an altimeter, which tells the pilot whether a plane is ascending, descending, or remaining at a steady altitude. To the left of the artificial horizon is an airspeed indicator. This gives the speed of the airplane relative to the outside air. To the right of the directional or heading indicator is a vertical speed indicator. This indicates the rate of climbs or descents. To the left of the heading indicator is a turn and bank indicator. This instrument is below the airspeed indicator. This tells the pilot whether the plane is level or banking, and whether the nose and tail of the aircraft are aligned with the direction of travel.

While there may be variations among these instruments, all are found in most modern aircraft and, when used properly, give sufficient flight performance information to the pilot(s) of the aircraft. Because of the critical need for appropriate instrument scanning and cross-checking, a variety of devices are used to assist the pilot(s) to fly the aircraft. In addition to the aforementioned stressors and a pilot's potential lack of experience, a situation such as an incorrect engine shutdown may occur. A recent example of this scenario occurred resulting in the loss of a TransAsia Airways ATR 72-600 on Feb. 4, 2015. The aircraft involved in the accident experienced an in-flight malfunction of the right engine. While troubleshooting the issue, the pilots attempted to shut down the malfunctioning (right) engine. However, the pilots mistakenly shut down the left engine, which was operating normally. This resulted in a loss of all thrust and an immediate descent by the aircraft. Realizing their mistake, the pilots attempted to restart the left engine. There was insufficient time to complete the restart process prior to reaching ground level. The aircraft stuck a vehicle bridge before coming to rest in a river resulting in substantial damage and loss of life.

As a result of the above-mentioned problem, inventors have attempted a number of ways to better provide pilots with the details of an emergency situation. One invention is detailed in U.S. Pat. No. 4,538,777 by Hall, which shows an invention related generally to the field of aircraft safety and more particularly to a system for instantly, clearly and precisely identifying the engine on which performance is degraded so that corrective and emergency safety measures may be undertaken. Hall's invention provides two main elements: (1) a detection system for determining when an engine has failed; (2) a light indicator located on the propeller control. Addressing part one, the current application is only an indication system. It does not provide a detection mechanism. However, Hall's detection system may provide a link between the system described in this patent and engines located on light aircraft, as many light aircraft are not currently equipped with a failure detection system. Addressing part two, Hall's light on the propeller control does overlap the new idea. However, Hall's system only indicates failures and/or loss of thrust, not fire or other conditions. Furthermore, Hall's system is limited to indications on the propeller controls, whereas the patent described here encompasses indication on multiple engine related systems and controls.

Despite this earlier work, there is still no adequate system for aiding pilots of aircrafts to engage the correct aircraft controls, thereby avoiding a potentially disastrous situation.

The current invention provides (a) light indicators for all primary engine controls (throttle and propeller controls) and many secondary controls; not just propeller controls. (b) The current invention includes a shutdown sequence with colored lights when needed. (c) The current invention includes push-to-cancel buttons for secondary lights, (d) The current invention provides optional feedback to the Flight Data Recorder (FDR), and (e) The current invention works with all multi-engine aircraft, not only propeller driven aircraft.

SUMMARY OF THE INVENTION

This invention is designed to help circumvent any air disaster resulting from pilot error during engine fire or malfunction. Specifically, the invention is directed towards illuminating the correct controls to be engaged by a pilot in the event of an emergency, such as fire or any other malfunctions that may develop into an accident.

The current invention, named Pilot Action Safety System (PASS, hereinafter) is designed to reduce the probability of a pilot inadvertently disabling a functional engine during emergency conditions. Fixed-wing aircraft (airplanes)

equipped with two or more engines have the potential to experience a mechanical issue with a single engine, while the other engine(s) remain fully functional. In such instances, it is possible that the pilot(s) may inadvertently disable one or more of the functioning engines. This issue is particularly prevalent in fixed-wing aircraft equipped with two engines, because an inadvertent shutdown or disabling of the functioning engine (following the failure or malfunction of the other) results in a substantial or compete loss of power.

In a first embodiment the present invention PASS provides the pilot(s) with visual indication of an engine issue/malfunction by illuminating the controls associated with a failed/malfunctioning engine. By illuminating the associated control, the pilot's attention is directed to the correct locations, thereby reducing the probability of selecting a control system for a properly functioning engine. The illumination of the related controls also increases the speed at which emergency procedures can be accomplished and reduces the probability of a required input being omitted.

PASS does not replace standard pilot procedures for responding to engine issues/anomalies. Rather, it provides a safeguard to prevent the inadvertent depowering of a functional engine, and functions as a backup source of emergency information for pilots. PASS has four modes of operation: normal operations (Mode 0); engine issues not requiring an immediate shutdown (Mode 1); first-response actions for immediate engine shutdown (Mode 2); and completion of lower priority engine-shutdown items (Mode 3). Refer to Table-1 for a summary of PASS Modes.

TABLE 1

(Summary of PASS Modes)

| Light Mode | Condition | Red Primary Lights | Red Secondary Lights | Amber Lights |
|---|---|---|---|---|
| 0 | Normal Operation | Extinguished | Extinguished | Extinguished |
| 1 | Engine Issue/Anomaly - Troubleshoot | Extinguished | Extinguished | Illuminated - Solid |
| 2 | Engine Fire/Shutdown - First Response Items | Illuminated - Flashing | Illuminated - Solid | Extinguished |
| 3 | Engine Fire/Shutdown - Lower Priority Items | Extinguished | Illuminated - Flashing | Extinguished |

In a second embodiment, during normal operations PASS provides no indications to the pilot(s) and no action is required. If a pilot determines that an engine must be shut down and PASS has not indicated the need for a shutdown, the pilot(s) may manually activate the system. Also, if a pilot begins an engine shutdown process without PASS activation, PASS will recognize the shutdown and activate, to assist the pilot(s) in the shutdown procedure. When an external input is received to indicate an issue with the engine that does not require immediate shutdown of the engine, PASS illuminates a set of amber lights for the controls associated with the affected engine (Mode 1). The amber lights provide the pilot(s) with guidance toward controls, which may help resolve the engine issue. Most importantly, the lights guide the pilot(s) away from controls that are associated with the other engines.

The second embodiment may further comprise a situation where, if the pilot(s) determines that an engine should be shut down in-flight and PASS has not activated itself, the pilot(s) may manually activate PASS, by selecting the manual activation switch. Selecting the manual activation switch places the system directly into Mode 2, illuminating red flashing lights for the primary controls and solid red lights for the secondary engine controls. Once the pilot(s) position the primary engine controls to command a shutdown of that engine, a set of optional Micro-Switches (wired in series) signals PASS that an engine shutdown has begun and that the most critical steps have already been taken by the pilot(s). This signal commands PASS to cancel (deactivate) the red flashing primary lights and to change the secondary red lights from solid to flashing (Mode 3). A manual sequencing button is provided for aircraft without the optional Micro-Switches and as a backup should the Micro-Switches fail to automatically sequence PASS from Mode 2 to Mode 3.

The flashing red lights located on (or near) the secondary engine controls may be canceled by the pilot(s) by pushing on the light (if push-to-cancel type). Once the light has been canceled, it will not illuminate again unless PASS is reset. When a light is pushed to cancel it, a signal is sent to the aircraft's on-board flight data recording systems, if installed. Once all of the red secondary lights have been pushed, no lights associated with PASS will be illuminated.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be explanatory and for reference.

BRIEF DESCRIPTION OF PRIOR ART

Figure 1:
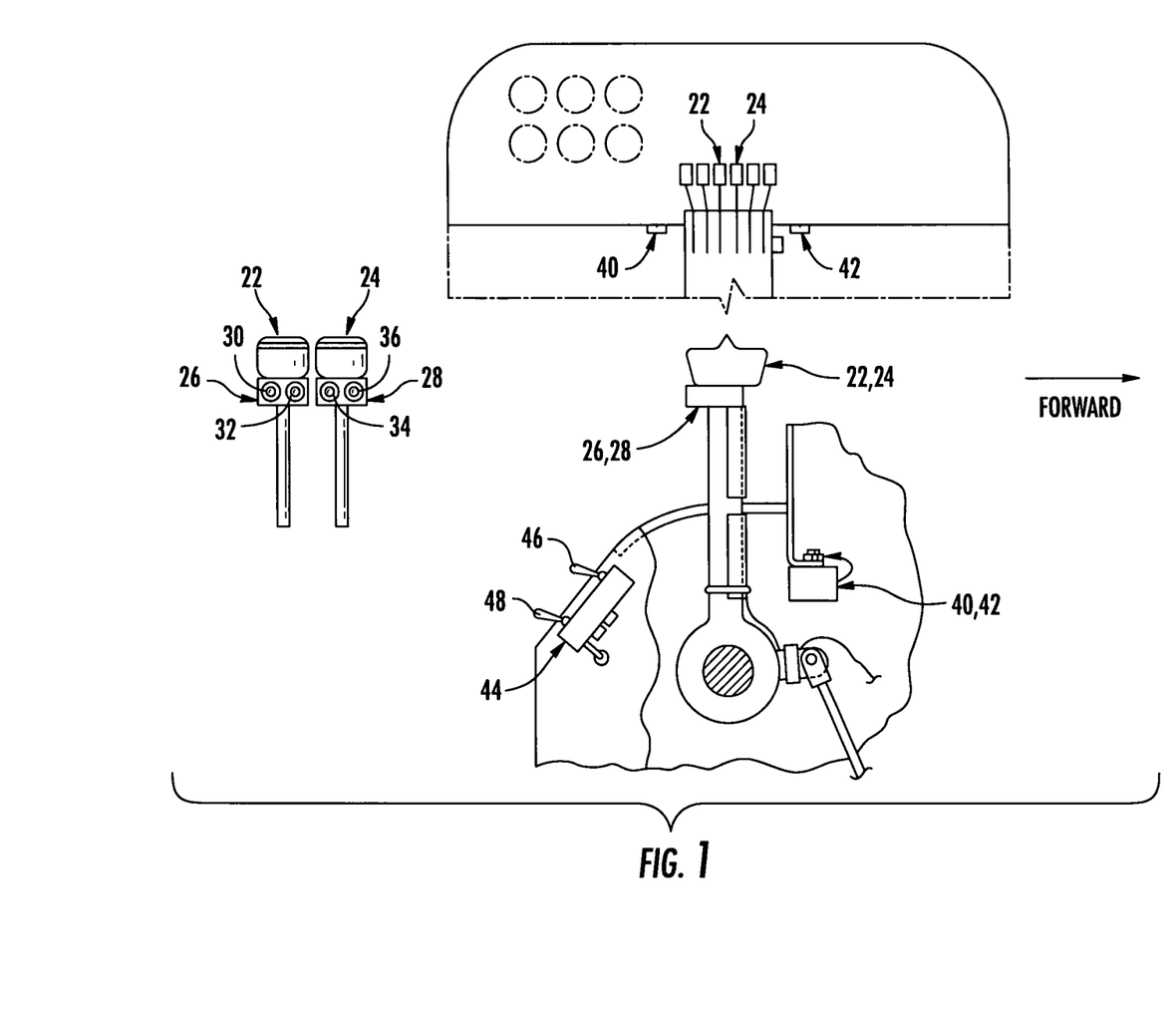
FIG. 1 provides the Hall Patent Figures Related to New Invention (Prior Art).

FIG. 1 is comprised of prior art contained in the Hall U.S. Pat. No. 4,538,777. The numbering used herein is consistent with the original Hall numbering. The prior art includes: Propeller controls with lights to indicate failures or loss of power, 22, 24, 26, 28, and aural indicators, 40, 42. The lights on the propeller controls include amber lights, 30, 34, indicating partial failure (loss of power) and red lights, 32, 36, indicating engine failure. Hall's patent includes a sensor heating system, controlled by a set of micro-switches, 44, 46, 48.

Figure 2:
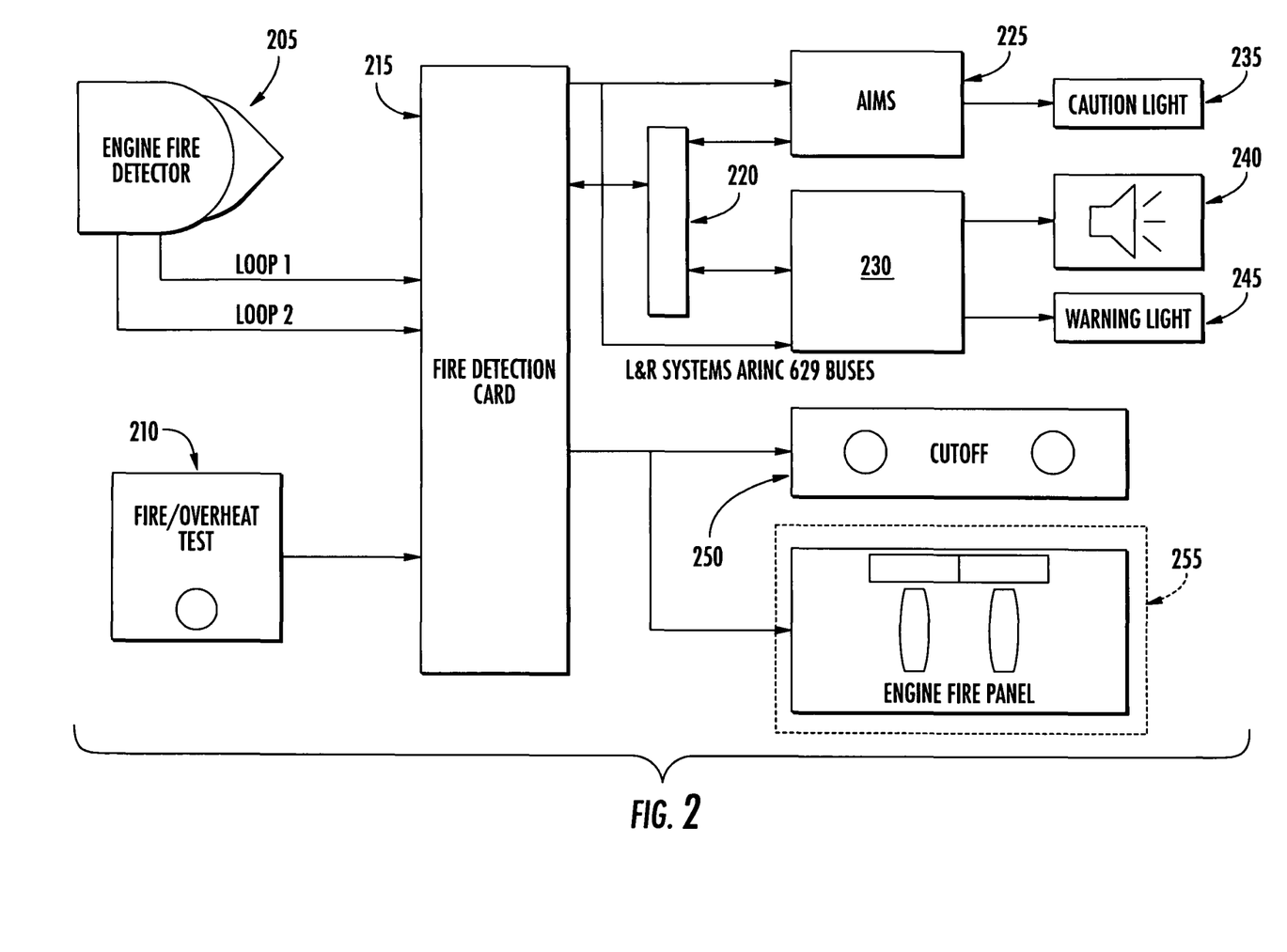
FIG. 2 provides a Fire Indication Via Lights on Fire Handles and Fuel Cutoff Switches (Prior Art)

FIG. 2 is comprised of prior art in use by Boeing Aircraft Corp. The new invention (PASS) does not overlap or encompass this prior art, but supplements it. The fire detection system, 205, provides a source of fire information for PASS. The Fire/Overheat Test button, 210, allows the pilot(s) to test the system. These inputs are processed by the Fire Detection Card, 215. The ARINC (Aeronautical Radio, Incorporated) buses, 220, 225, 230, allow data to be transmitted to ground receivers. The fire signal is used to create an audio warning, 240, and a visual alert, 245.

The prior art includes the use of lights embedded in Fuel Cutoff switches, 250. The use of lights in conjunction with Fuel Cutoff switches is excluded from the new invention but shows the viability of using lights in conjunction with a fuel control. Similar to the Fuel Shutoff switches, 250, the use of lights in Fire Suppression controls, 255, is excluded from the new invention.

Figure 3:
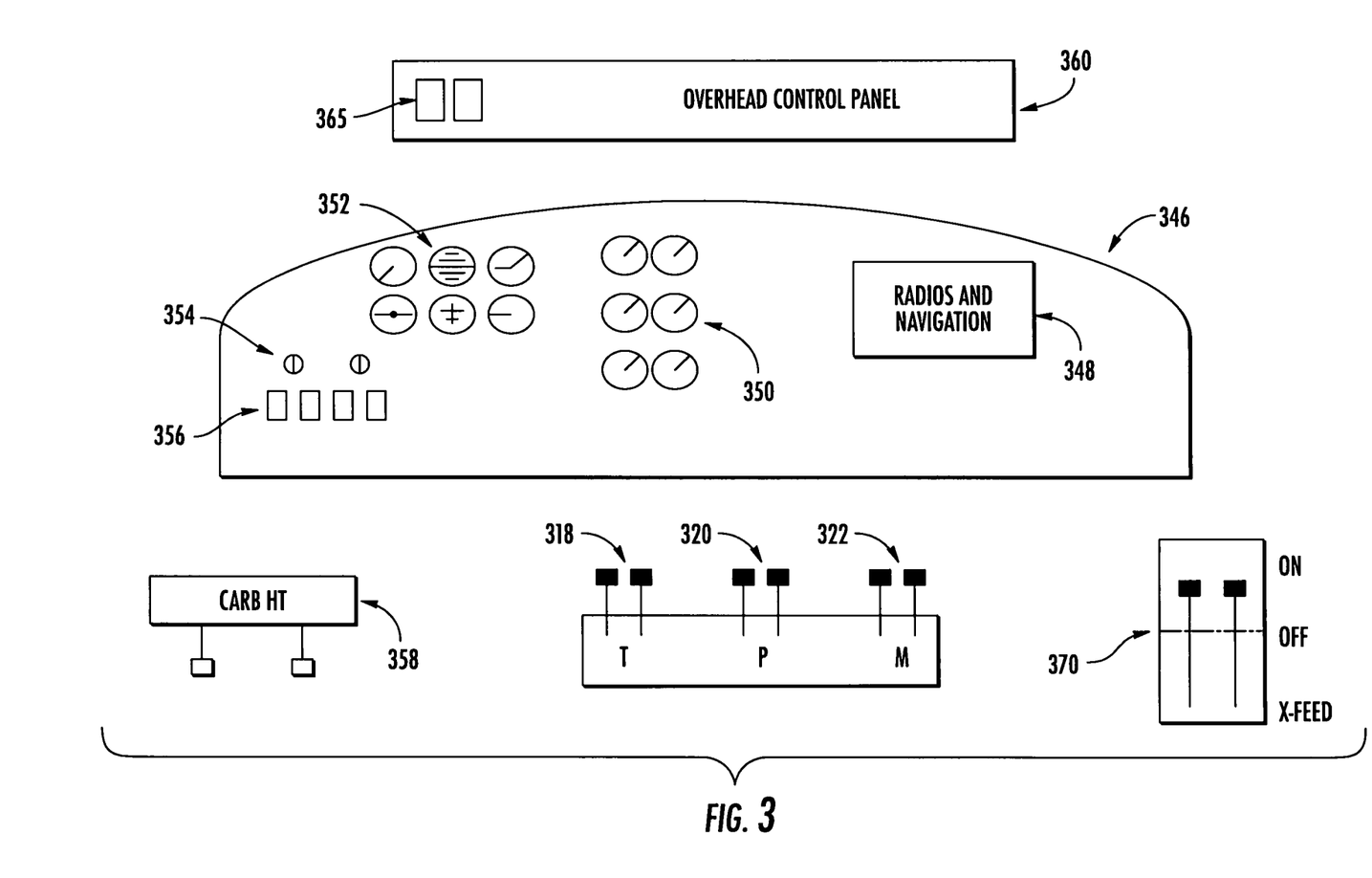
FIG. 3 provides a Common Multi-Engine Aircraft Cockpit, Controls and Instruments (Prior Art).
Figure 5:
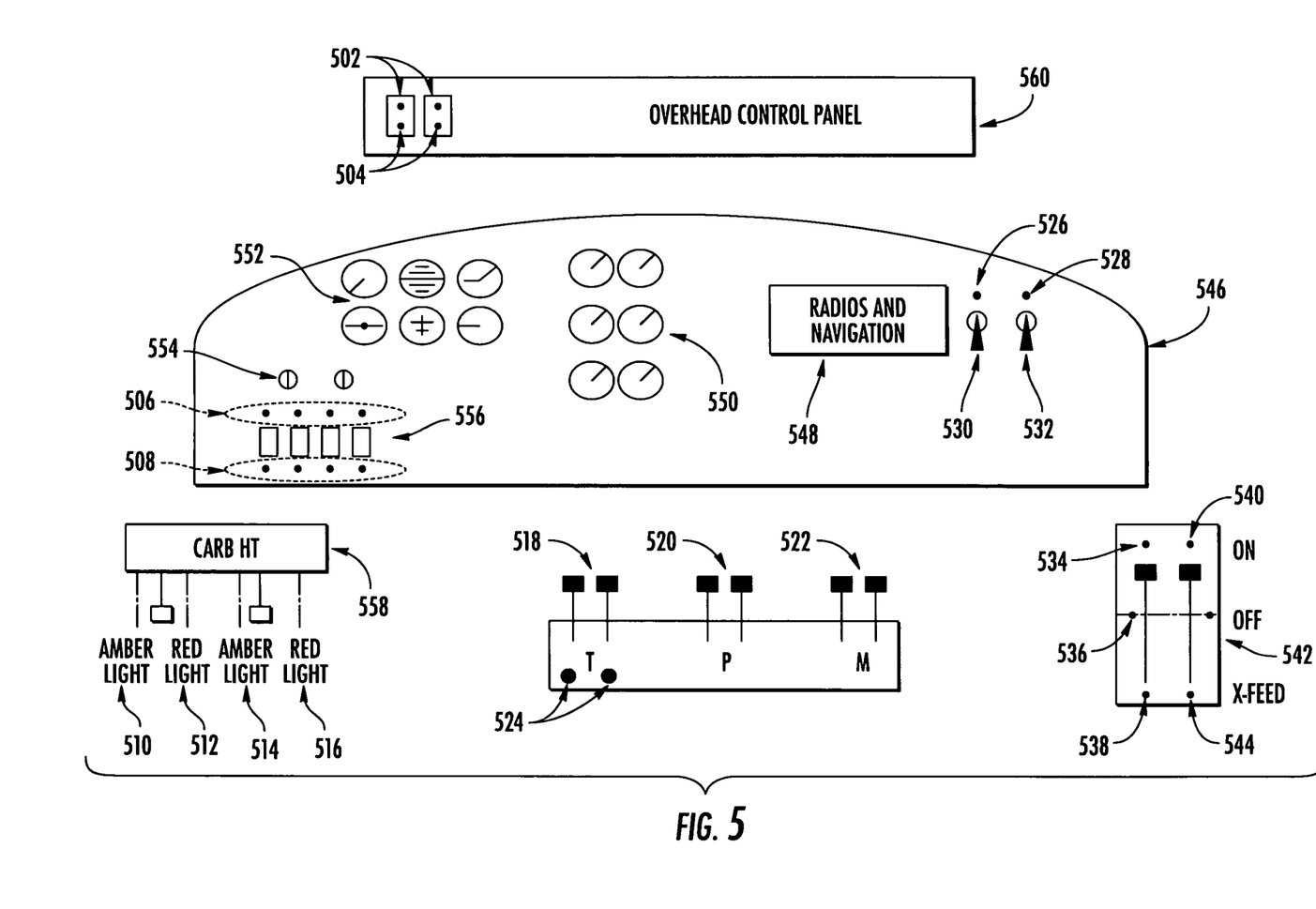
FIG. 5 provides a Common Multi-Engine Aircraft Cockpit, with amber and red lights in accordance with an embodiment of the present invention.

The numbering in FIG. 3 depicts several items of prior art. These items are depicted in FIG. 3 independent of the new invention. FIG. 5 provides an integration of both prior art and the new invention.

Most aircrafts include a power control in the form of a thrust lever, power, lever, throttle, or similar control, 318. Many propeller driven aircraft include a propeller control lever, 320. Most propeller driven aircraft have a fuel/air mixture control, condition lever, or similar engine control, 322.

Several components of PASS could be installed on the cockpit's main instrument panel, 346. The main instrument panel of most aircraft includes radios and navigation equipment, 348. The main instrument panel also includes engine performance instruments, 350, and flight instruments, 352.

The main instrument panel on an aircraft typically includes various knobs, 354, and switches, 356. Piston aircraft equipped with carburetors typically encompass a carburetor heat function, which is controlled from the cockpit, 358. Some aircraft encompass an overhead control panel, 360. This panel includes various switches, 365, and/or controls, and may be used for installation of PASS components.

Some aircraft are equipped with a set of fuel controls separate from other control systems. In some versions, the fuel controls are located on an independent control panel, 370, located in the cockpit.

PASS is installed on or near switches/controls in the cockpit. These switches/controls are part of the prior art and includes, but are not limited to, the examples depicted in FIG. 4.

Figure 4:
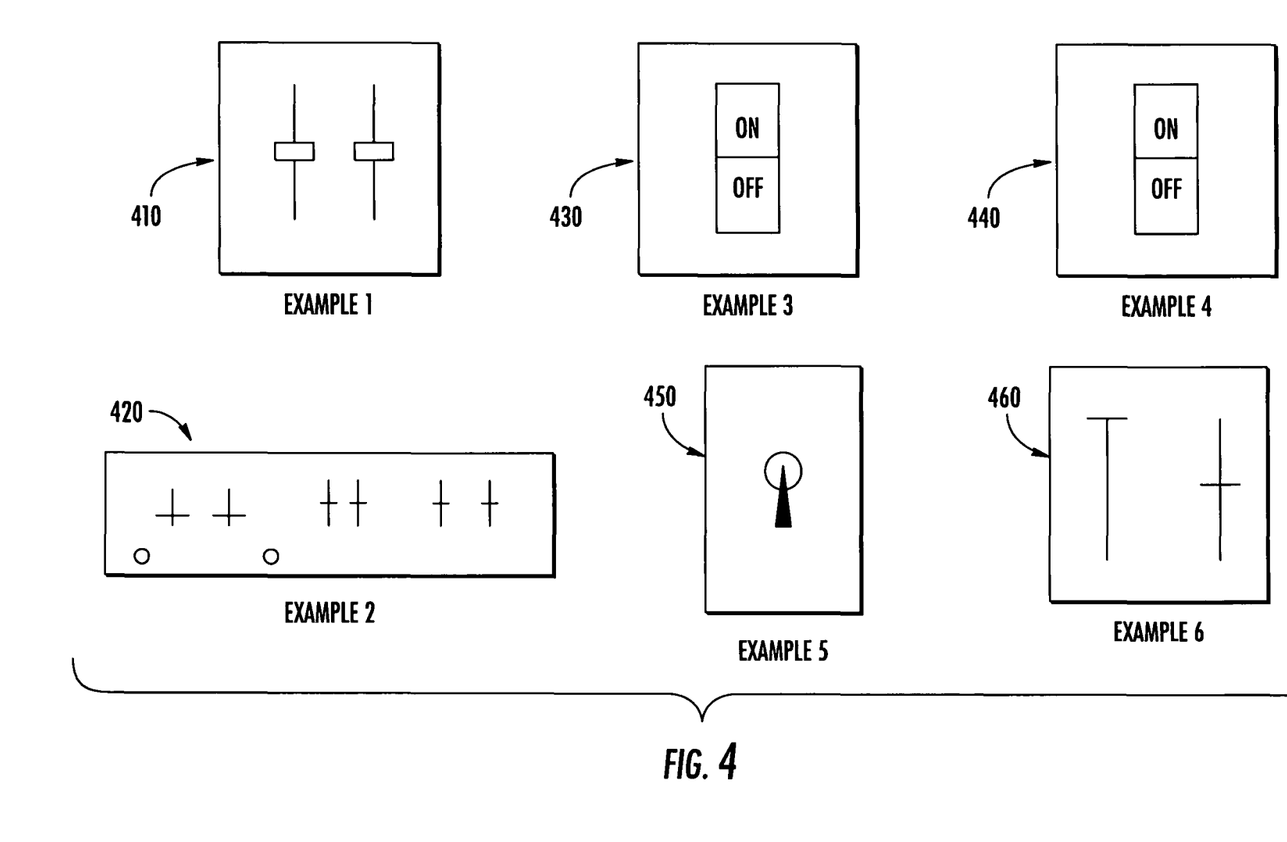
FIG. 4 provides a Common Multi-Engine Aircraft Switches and Controls (Prior Art).

A movable, sliding control is used to control systems with multiple operating modes, 410. Engine control systems typically include, but are not limited to: a thrust/power control, a carburetor heat control (if carbureted engine design), propeller controls, and fuel mixture/engine condition controls, 420.

Typical switches used in aircraft include, but are not limited to: switches with labels on the switch, 430, 440, and on/off switches without labels on the switch, 450. (Note: in this depiction, Example 3, 430, and Example 4, 440, are the same.)

Some aircraft are equipped with a set of fuel controls separate from other control systems. In some versions, the fuel controls are located on an independent control panel, 460, located in the cockpit.

The numbering in FIG. 5 includes several items of prior art. These items are depicted in FIG. 3 independent of the new invention. FIG. 5 provides an integration of both prior art and the new invention.

Most aircraft include a power control in the form of a thrust lever, power, lever, throttle, or similar control, 518. Many propeller driven aircraft include a propeller control lever, 520. Most propeller driven aircraft have a fuel/air mixture control, condition lever, or similar engine control, 522.

Several components of PASS could be installed on the cockpit's main instrument panel, 546. The main instrument panel of most aircraft includes radios and navigation equipment, 548. The main instrument panel also includes engine performance instruments, 550, and flight instruments, 552.

The main instrument panel on an aircraft typically includes various knobs, 554, and switches, 556. Piston aircraft equipped with carburetors typically encompass a carburetor heat function, which is controlled from the cockpit, 558. Some aircraft encompass an overhead control panel, 560. This panel may be used for installation of PASS components.

Figure 6:
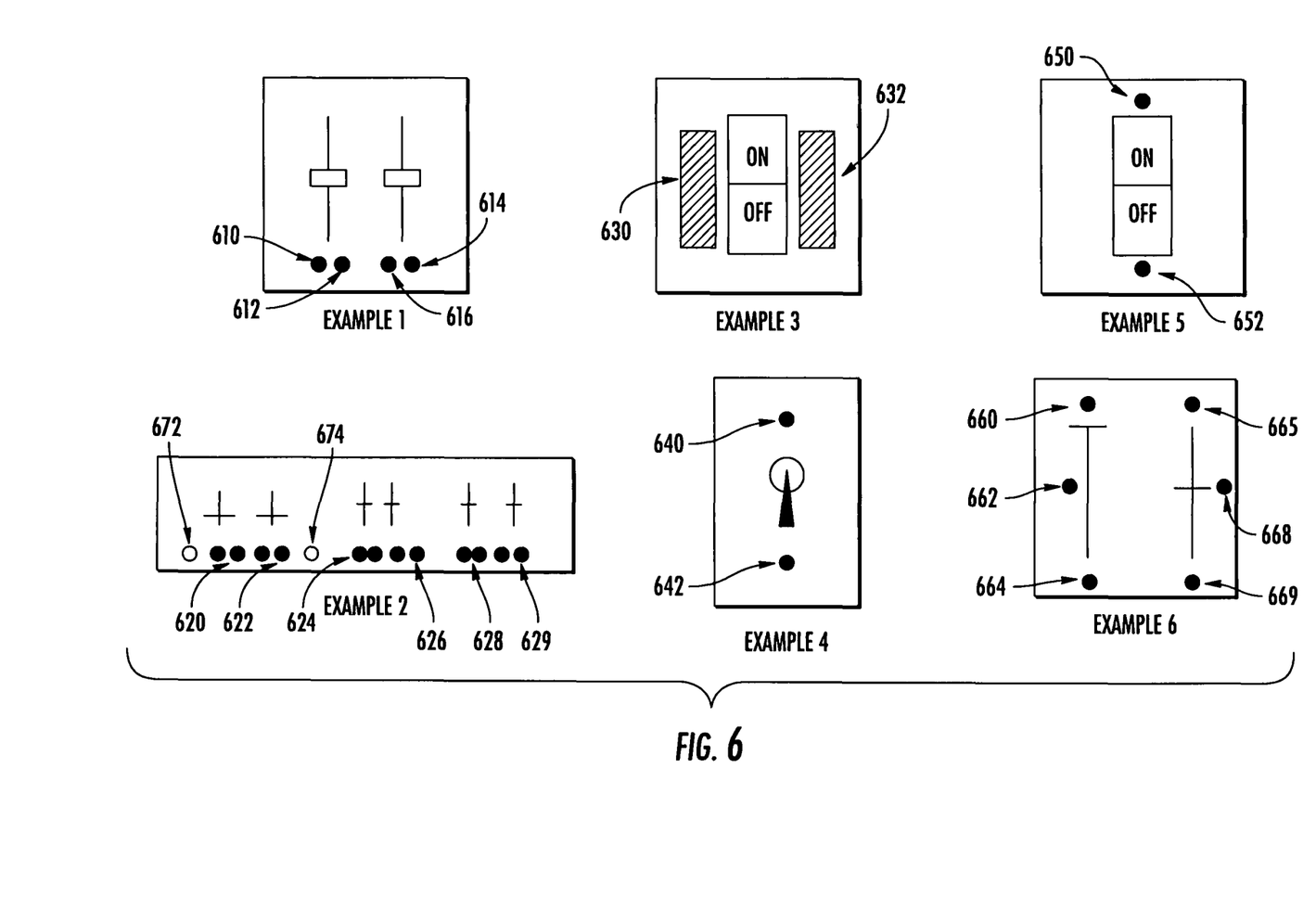
FIG. 6 provides Common Multi-Engine Aircraft Switches and Controls, with amber and red lights in accordance with an embodiment of the present invention.

The numbering in FIG. 6 includes two items of prior art. The small, open circles in Example 2, 672, 674, represent the carburetor heat controls, which may be co-located with other engine controls, or installed in a separate location. (Not all aircraft are equipped with a carburetor heat system.) In Example 2, 672, 674, the carburetor heat is depicted as co-located with the throttle control.

DETAILED DESCRIPTION OF THE INVENTION

The present invention will now be described in more detail with reference to example embodiments as shown in the accompanying drawings. While the present invention is described herein with reference to the example embodiments, it should be understood that the present invention is not limited to such example embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one embodiment, and in reference to FIG. 5, a Pilot Action Safety System (PASS) block by block is disclosed herein:

Fuel pump and other switches may contain amber lights, 502, to direct the pilot(s) to turn on a switch during an engine malfunction, and a red light, 504, to direct the pilot(s) to turn off a switch in response to an engine fire or mandatory engine shutdown situation. In some cases, the amber light(s) may be located adjacent to the respective switch or control, 506. In some cases, the red light(s) may be located adjacent to the respective switch or control, 508.

Amber lights may be located on or adjacent to aircraft engine controls, 510, 514 (control-adjacent-light example shown.) Red lights may be located on or adjacent to aircraft engine controls, 512, 516 (control-adjacent-light example shown.) A standard twin-engine piston or turbo-prop aircraft includes a throttle/power lever, 518, propeller/condition lever, 520, and/or a fuel/air mixture control, 522. The invention provides for each of these controls to include a red, and an amber light on each lever, 518, 520, and 522, respectively.

A set of buttons, 524, located below the throttle/power lever (thrust lever on jet aircraft) provides for manual sequencing from Mode 2 to Mode 3, in the event that the aircraft is not equipped with optional Micro-Switch system, or such system fails.

A push-to-test button, 526, allows the pilot(s) to test the amber (Mode 1) portion of the system for proper function on the ground or in flight. A separate push-to-test button, 528, allows the pilot(s) to test the red (Mode 2 and Mode 3) portion of the system for proper function on the ground or in flight. The manual activation switches, 530 and 532, place the system directly into Mode 2, unless the system is already in Mode 3. The manual activation switch is manipulated by the pilot(s) when the pilot(s) determine that a shutdown is necessary and PASS has not already indicated such. A separate manual activation switch is provided for each engine.

In some configurations, multiple amber lights, 534, 538, 540, 544 may be illuminated, to direct the pilot(s) to two or more possible switch/control positions. Some configurations may also include secondary red light(s), 536, 542, to indicate the position required for an engine shutdown.

In one embodiment, and in reference to FIG. 600, a Pilot Action Safety System (PASS) block by block is disclosed herein:

In some configurations, the amber lights, 610 and 616, may be co-located with a red secondary light, 612, 614. In a typical light configuration, amber lights will be co-located with red primary lights on or near the primary engine controls, 620, 622, 624, 626, 628, 629. In addition to circular lights, vertical or horizontal light bars may be used for amber light, 630, and/or red lights, 632.

In a typical configuration, amber lights, 640 and 650, may be used to indicate the required position of a switch/control in order to trouble-shoot an engine issue other than fire, while in flight. Also, in a typical configuration, red lights, 642, 652 may be used to indicate the required position of a switch/control in order to shut down an engine, while in flight.

Where multiple control positions may be appropriate for trouble-shooting, multiple amber lights, 660, 664, 665, 669, may illuminate simultaneously. Red secondary lights, 662 and 668, may also be installed on such control, in case of engine fire and/or a mandatory engine shutdown.

Figure 7:
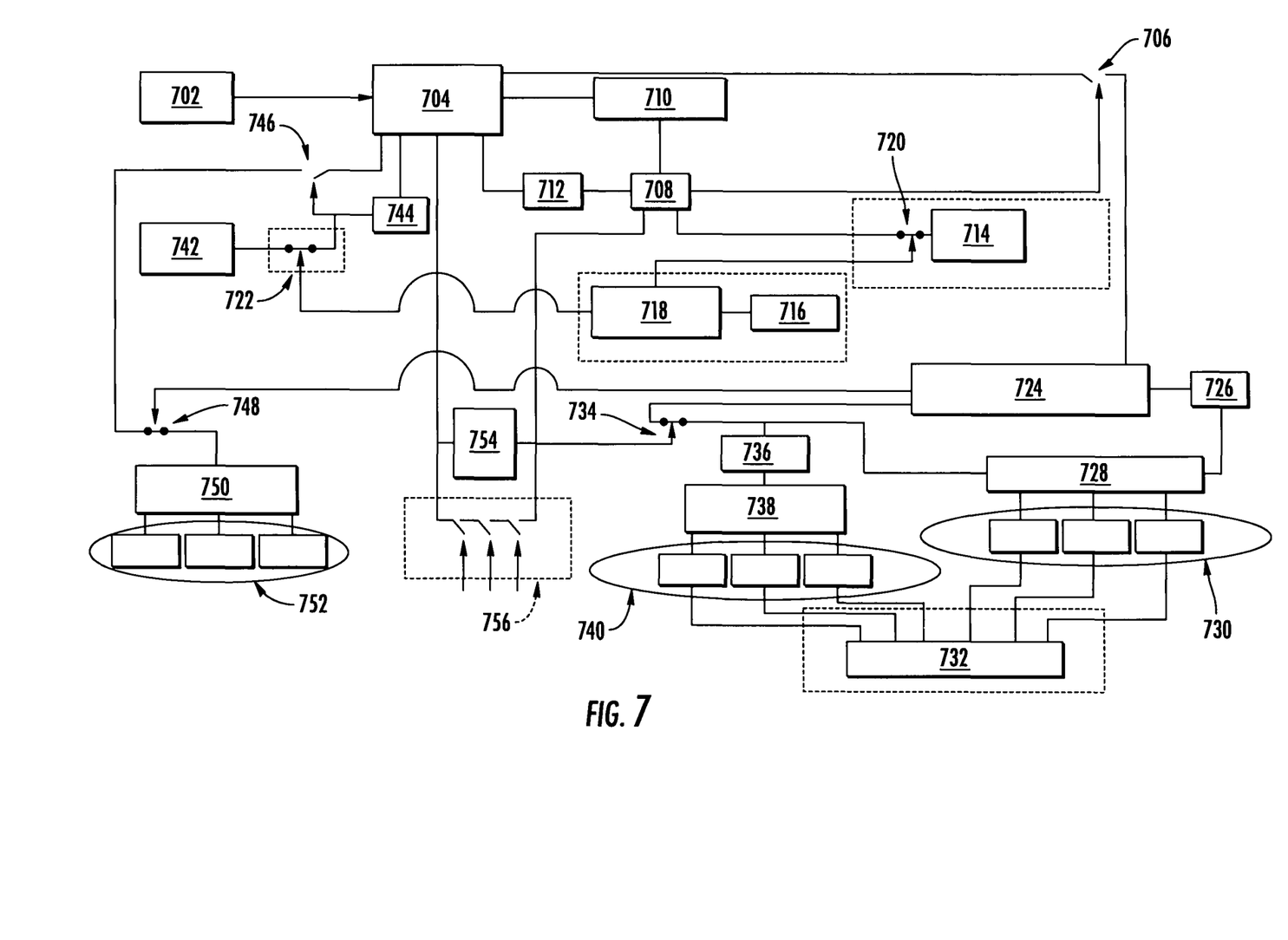
FIG. 7 provides an Electrical Circuit in accordance with an embodiment of the present invention.

In one embodiment, and in reference to FIG. 7, a Pilot Action Safety System (PASS) block by block is disclosed herein:

System Power Source

Power for the system comes from the aircraft's main power system, 702. The aircraft's backup power system may also be used to power PASS. The power is then directed to the Main Power Bus, 704. The Main Power Bus, 704, powers the Red Push-to-Test Button, 710, the Manual Activation Switch, 712, the Amber Push-to-Test Button, 744, the Amber Light Bus, 750, and the Fire/Mandatory Shutdown Bus, 724.

Electronically-Controlled Switch for Fire/Mandatory Shutdown

An electronically-controlled switch, 706, connects the Fire/Mandatory Shutdown Bus, 724, to the Main Power Bus, 704. The switch, 706, is controlled by the Mandatory Activation Bus, 708. The Mandatory Activation Bus activates the switch, 706, anytime the bus is powered. The bus, 708, may be powered by the Red Push-To-Test Button, 710, Manual Activation Switch, 712, Manual Sequencing Switch, 754, Micro-Switches, 756, or the External Fire Input, 714. The Red Push-To-Test Button, 710, portion of the system, provides a temporary connection between the main power bus and the Mandatory Activation Bus, in order for the pilot(s) to test the system prior to flight.

Manual Activation Switch

The Manual Activation Switch, 712, allows the pilot(s) to activate the system in the red, fire/shutdown mode. The switch, 712, is intended for situations in which the automated portions of the system fail to command a shutdown, or the optional fire detection input is not installed and the pilot(s) detects or suspects an engine fire. The Manual Activation Switch, 712, may also be used by the pilot(s) to assist in any other non-normal shutdown, deemed necessary by the pilot(s).

Fire Indication Input (Optional)

For aircraft equipped with an engine fire detection system, an external fire detection indication, 714, will power the Mandatory Activation Bus, 708. Aircraft without an (optional) external input for fire detection, 714, will require the pilot(s) to select on (close) the Manual Activation Switch, 712, in case of engine fire or suspected engine fire.

Fire/Mandatory Shutdown Bus and Related Circuitry

When electronically-controlled switch, 706, is closed power is directed to the Fire/Mandatory Shutdown Bus, 724. The Fire/Mandatory Shutdown Bus, 724, provides power to the red lights and related circuitry. Anytime the Fire/Mandatory Shutdown Bus, 724, is powered, the Flashing Circuitry, 726, is powered. The Flashing Circuitry, 726, creates an electrical pulse, allowing the lights downstream, 730, to flash when required.

An electronically-controlled switch, 734, connects the Fire/Mandatory Shutdown Bus, 724, directly to the Secondary Red Light Bus, 728, and to the Flashing Circuitry for the Primary Red Lights, 736.

Red (Primary) Lights

The Flashing Circuitry, 736, for the Red (Primary) Lights, provides pulsing power to the Primary Red Light Bus, 738, to allow the Red (Primary) Lights, 740, to flash. The Red (Primary) Lights, 740, are co-located with the primary engine controls, including but not limited to: throttle, thrust level, power level, condition level, air/fuel mixture control, and propeller control. The Red (Primary) Lights, 740, operate only in flashing mode, and may not be canceled (unilluminated) independently.

Secondary Red Light Bus and Red (Secondary) Lights

The Secondary Red Light Bus, 728, directly powers the Red (Secondary) Lights, 730, anytime the bus is powered. The number of Red (Secondary) Lights, 730, depends on the specific aircraft configuration, with no upper limit. The Red (Secondary) Lights, 730, may be Push-to-Cancel type, and will cease all illumination after being pressed by the pilot(s). In addition, each selection (pressing) of a Red (Secondary)

Light, 730, transmits a signal to the aircraft's Flight Data Recorder, 732, or other recording device (if one is installed).

Engine Issue/Anomaly

An electronically-controlled switch, 746, connects the Amber Lights Bus, 750, to the Main Power Bus, 704. The electronically-controlled switch, 746, is moved to the closed position anytime power is received from the Amber Push-to-Test Button, 744, or the External Engine Input for anomalies and non-fire issues, 742.

The Amber Lights Bus, 750, directly powers the Amber Lights, 752, anytime the bus is powered. The number of Amber Lights, 752, depends on the specific aircraft configuration, with no upper limit. Amber Lights, 752, illuminate continuously when powered and may not be individually canceled.

An electronically-controlled switch, 748, inhibits powering of the Amber Lights Bus, 750, when in the open position. The electronically-controlled switch, 748, is controlled by the Fire/Mandatory Shutdown Bus, 724. The switch, 748, is moved to the open position anytime the Fire/Mandatory Shutdown Bus, 724, is powered.

Operation of Manual Sequencing Switches and Optional Micro Switches

To transition PASS to Mode 3 from another mode, an optional set of Micro-Switches located on the primary controls, 756, connects the Main Power Bus, 704, to an electronically-controlled switch, 734, which disconnects the Fire/Mandatory Shutdown Bus, 724, from the flashing circuit, 736, for the Red (Primary) Lights and removes the direct connection to the red secondary lights, 728. The Micro-Switches, 756, are wired in series and will send power to the electronically-controlled switch, 734, when all of the Micro-Switches, 756, are in the closed position. The Micro-Switches, 756, also power the Mandatory Activation Bus, 708, to ensure a shutdown is commanded.

A Manual Sequencing Switch, 754, accomplishes the same task as the Micro-Switches, 756, and is activated manually by the pilot(s), when the aircraft is not equipped with the Micro-Switch option, 756, or if the system fails to sequence automatically. When the Manual Sequencing Switch, 754, is moved to the closed position, the Main Power Bus, 704, is connected to an electronically-controlled switch, 734 and to the Mandatory Activation Bus, 708.

Weight-On-Wheels System (Optional)

Aircraft with a Weight-On-Wheels detection system will provide a Weight-On-Wheels (WOW) Signal, via the WOW External Input, 716. The WOW Input, 716, powers the Weight-On-Wheels Bus, 718. The Weight-On-Wheels Bus, 718, in turn, powers an electronically-controlled switch, 720, and a second electronically-controlled switch, 722. The electronically-controlled switch, 722, disconnects the External Engine Input for Anomalies and Non-Fire Issues from the system. The second electronically-controlled switch, 720, disconnects the Engine Fire Input from the system.

Flight Data Recording Output (Optional)

For aircraft equipped with a Flight Data Recorder or other recording device, 732, PASS may provide an output signal from each amber light, 740, and secondary red light 730. This allows the aircraft's recording device to maintain a record of the actions taken by the pilot(s).

Figure 8:
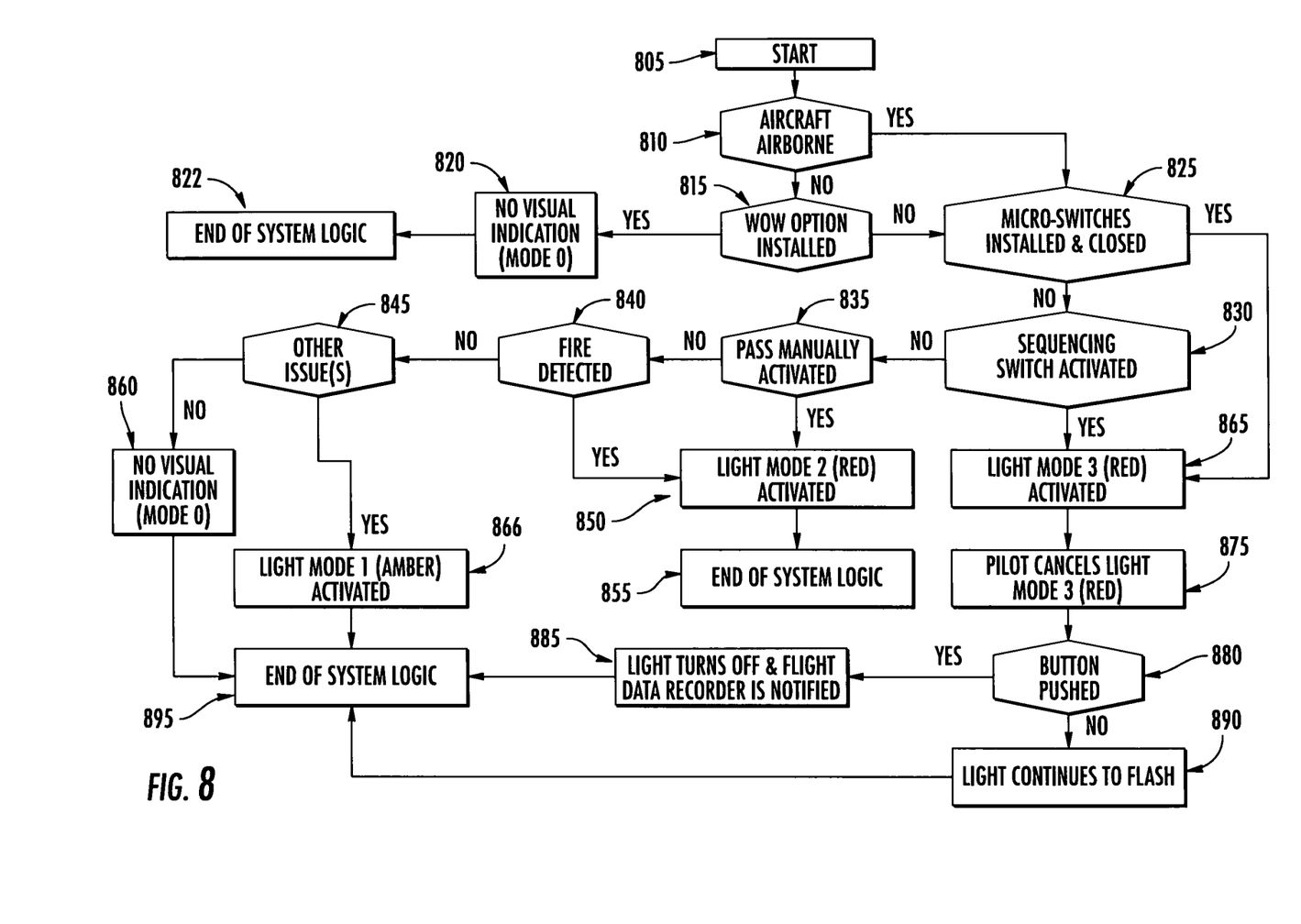
FIG. 8 provides a System Logic in accordance with an embodiment of the present invention.

System Logic Flow Chart (FIG. 8)

In another embodiment, and in reference to FIG. 8, a system logic showing steps for system-wide check is disclosed herein:

The system logic starts at 805 and applies anytime the aircraft is in operation (engine operating). If the aircraft is airborne, 810, system indications are available. If the weigh-on-wheels option is not installed, 815, the system indications will be available anytime the system is powered, including on the ground. If the aircraft has the weight-on-wheels option installed and is on the ground, there will be no visual indications, 820, and the system logic ends, 822.

If the micro switch option is installed and the switches are in the closed position, 825, Mode 3 is activated, 865. If the micro switches are not installed or not closed, 825, the next logic step is the sequencing switch, 830. If the sequencing switch is selected to on (closed), 830, Mode 3, 865, will activate (regardless of the micro switch positions, 825).

Once light Mode 3 is activated, 865, the pilot(s) may individually cancel (deactivate) the red secondary lights, 875, (if the push-to-cancel type are installed). The lights are canceled by pressing the integrated push-to-cancel button, 875. Before an individual push-to-cancel button switch is pushed by the pilot(s), 880 it will continue to flash red, 890. After an individual push-button switch is pushed by the pilot(s), 875, the individual red light will extinguish and the Flight Data Recorder is notified that the light was extinguished, 885, if a Flight Data Recorder is installed. The system logic ends after notifying the Flight Data Recorder, 895, if installed. For PASS installations without push-to-cancel type lights, the secondary lights continue to flash red, 890, at the end of the logic, 895.

If the micro-switches, 825, are not closed and the manual sequencing switch is selected to off (open), 830, proceed to step 835. If the manual activation switch, 835, is selected to on (closed), Mode 2 is activated, 850, and the system logic ends, 855. If the manual activation switch is selected to off (open), proceed to step 840. If an engine fire indication is received by the system, 840, Mode 2 is activated, 850, and the system logic ends, 855. If a fire indication is not received by the system, 840, proceed to step 845. If an engine issue or failure indication is received from the external input, 845, light Mode 1 is activated, 866, and the system logic ends, 895. If no engine issue or failure indication is received, 845, there will be no visual indications, 860, and the system logic ends, 895.

A separate PASS installation is required for each engine on the aircraft. Each PASS functions independently of the other(s) and monitors only one engine. The separate PASS installations do not interconnect with each other, except that they may share a power source, 702, and the push-to-test bottoms installed in the cockpit may provide system testing for multiple PASS installation 526, 528.

Figure 9:
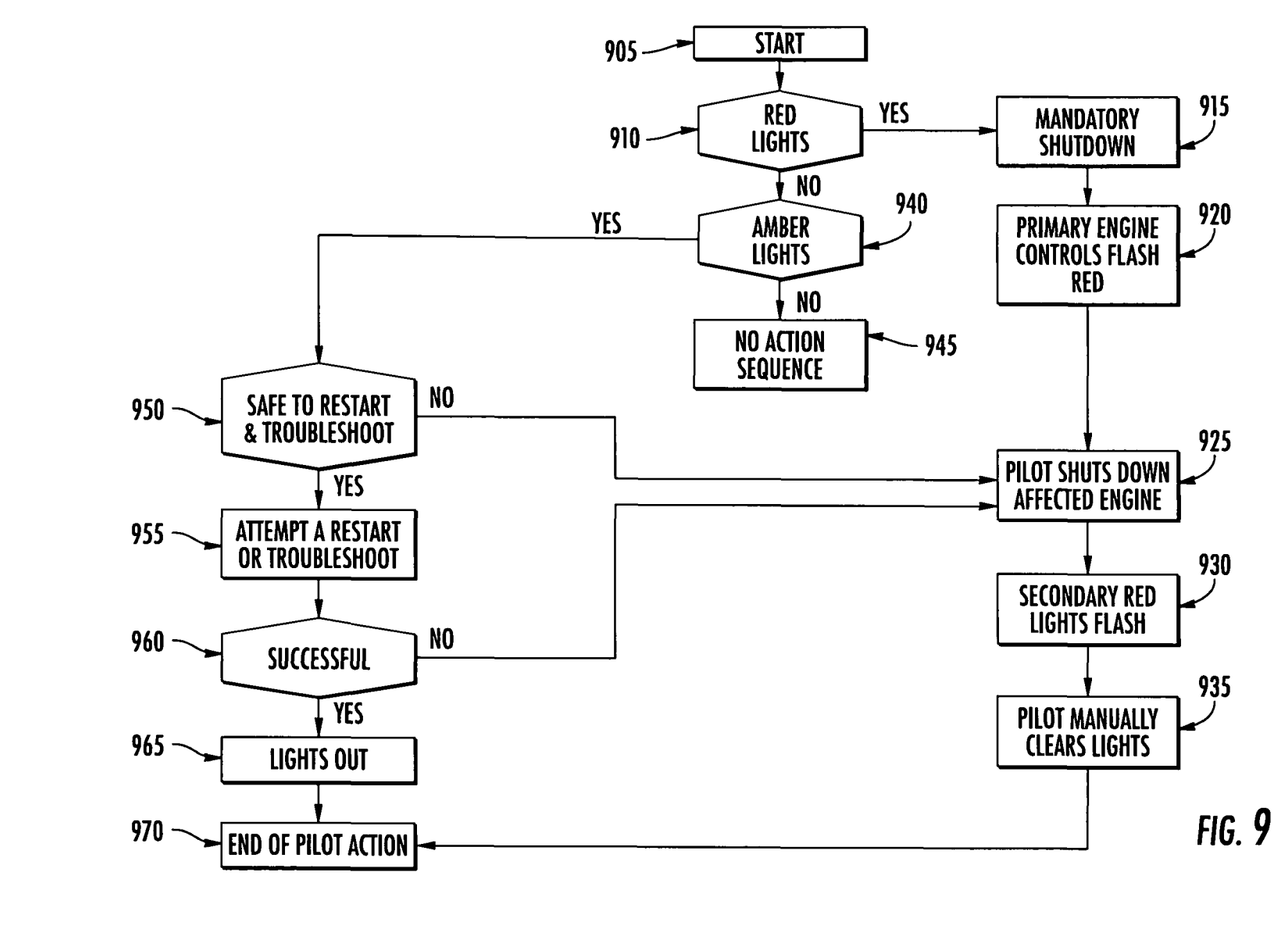
FIG. 9 provide Pilot's Actions and Inputs in accordance with an embodiment of the present invention.

Pilot Action Input Sequence Flow Chart (FIG. 9)

In yet another embodiment of the present invention, and in reference to FIG. 9, a Pilot Action Input Sequence in the event of a possible situation requiring a shutdown of an engine is disclosed herein:

No Engine Fire, Issue or Malfunction (No Lights Illuminated)

The pilot's logic starts at 905 and applies anytime the aircraft is in operation (engine operating). If the red flashing light(s) are not displayed on the primary engine controls, 910, then the pilot proceeds to 940 and determines if any amber lights are displayed. If no amber light is displayed, the process moves to step 945 where no action sequence is required.

Engine Issue/Malfunction Troubleshoot Logic
(Amber Lights Illuminated)

If amber lights are displayed, the pilot determines if the engine is safe to troubleshoot and/or restart as required, 950. The determination to troubleshoot and/or restart, 950, is based on the other cockpit indications and pilot judgement. The system does not advise the pilot on whether to troubleshoot or restart.

If the pilot(s) determines that the engine is not safe to restart or troubleshoot, 950, the engine must be fully shut down, 925. The shutdown process must be completed manually by the pilot(s). After the affected engine is shut down, the red lights located on the secondary engine controls will flash, 930. The pilot(s) then cancels (deactivates) each secondary light individually, 935, after confirming that the control associated with the light is in the correct position for the current phase of flight. For versions which do not include the optional micro-switches, the pilot(s) must select the manual sequencing switch prior to canceling the individual secondary lights. This ends the pilot's response to the system output, 970.

If the pilot determines that the engine is safe to restart or troubleshoot, 950, the pilot(s) may attempt to solve the triggering engine issue or failure. If the pilot's attempt(s) to troubleshoot and/or restart the engine are unsuccessful, 960, the pilot(s) must shut down the affected engine, 925, and follow the subsequent steps, 930 and 935. The pilot(s) then deactivates each secondary light individually, after confirming that the control associated with the light is in the correct position for the current phase of flight. For versions which do not include the optional micro-switches, the pilot(s) must select the manual sequencing switch prior to deactivating the individual secondary lights. This ends the pilot's response to the system output, 970.

If the pilot(s) determine(s) that the engine is safe to restart or troubleshoot, 955, and is successful, 960, all lights will extinguish, 965. Once all lights have extinguished, no further pilot action is required, 970. If the pilot elects not to attempt to resolve the issue, the engine must be fully shut down, 925, and subsequent steps followed, 930 and 935. Once the lights are canceled, 935, the pilot's actions are complete with respect to PASS, 970.

Engine Fire and/or Mandatory Shutdown Logic
(Red Lights Illuminated)

If a red flashing light(s) are displayed on the primary engine controls, 910, an engine must be shut down and the pilot proceeds to 915. Using the red lights to determine which engine must be shutdown, 920, the pilot shuts down the affected engine, 925. Once the engine is shutdown, the pilot follows the appropriate emergency checklist and adjusts the switch/control associated with the shutdown engine. Then switches/controls will display a red flashing light, 930. After the switch/control has been correctly adjusted, the pilot may manually cancel the light by pushing on it (if a push-to-cancel style light is installed), 935. Once the lights are canceled, 935, the pilot's actions are complete with respect to PASS, 970.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

Definitions

1. Primary Engine Controls include, but are not limited to: Thrust Lever, Power Lever, Throttle, Fuel/Air Mixture Control, Engine Condition Lever, and Propeller Lever.
2. Non-Primary Engine Related Controls consist of, but are not limited to: Carburetor Heat Controls, Alternator/Generator Systems, Fuel Control Switches, Engine-Driven Hydraulic Systems, Engine Ignition Switches, Engine Start/Stop Controls.
3. Lights refer to any color light, light bulb, LED, or other light emitting device. The colors included in the above text (Amber and Red) are used for demonstration purposes. Any colored light or combination of colored lights may be used in the implementation of this invention.
4. Engine malfunctions include, but are not limited to: failures, partial failures, intermediate failures, loss of power, anomalies, any non-normal condition, any non-normal operation, and any un-commanded condition or operation.

The following is claimed:

1. An electrical system for guiding a pilot of a multi-engine aircraft to respond to an engine malfunction and an engine fire comprising:
   a. A first multitude of lights located on one or more primary engine controls of a multi-engine aircraft, said first multitude of lights being powered by said multi-engine aircraft's main power system;
   b. A second multitude of lights located on one or more secondary engine controls of said multi-engine aircraft, said second multitude of lights being powered by said multi-engine aircraft's main power system;
   c. One or more power control busses to provide power to said first multitude of lights and said second multitude of lights;
   d. Flashing circuitry, said flashing circuitry being comprised of one or more circuits whereby said flashing circuitry is activated by said one or more power busses, causing said flashing circuitry to send an electrical pulse to said first multitude of lights causing said first multitude of lights to flash on and off;
   e. Said flashing circuitry being comprised of one or more circuits whereby said flashing circuitry is activated by said one or more power busses, causing said flashing circuitry to send an electrical pulse to said second multitude of lights causing said second multitude of lights to flash on and off; and f. wiring connecting said first multitude of lights, said second multitude of lights, said power busses, and said flashing circuitry such that:
  i. when none of said multi-engine aircraft's engines are malfunctioning and none of said multi-engine aircraft's engines are on fire, said power busses do not provide power to said first multitude of lights and said second multitude of lights;
  ii. when one engine of said multi-engine aircraft is malfunctioning, said power busses provide power to certain lights in said first multitude of lights and certain lights in said second multitude of lights;
  iii. when there is a fire in one engine of said multi-engine aircraft, said power busses provide power to certain lights in said first multitude of lights and certain lights in said second multitude of lights; and
  iv. said power busses and said flashing circuitry send power to certain lights in said first multitude of lights and certain lights in said second multitude of lights such that said primary controls and said secondary controls are illuminated to guide said pilot in an event of an engine malfunction;
  v. said power busses and said flashing circuitry send power to certain lights in said first multitude of lights and certain lights in said second multitude of lights such that said primary controls and said secondary controls are illuminated to guide said pilot in an event of an engine fire;
  vi. a manual sequencing button which, when said manual sequencing button is pressed, causes said power busses and said flashing circuitry to discontinue sending power to said first multitude of lights and send power to certain lights in said second multitude of lights such that only said secondary engine controls are illuminated to guide said pilot in shutting down lower priority items; and
  vii. a manual activation button which, when said manual activation button is pressed, activates said electrical system.

2. The system of claim 1 further comprising a step of making certain lights in said second multitude of lights to be a push-to-cancel variety whereby when the certain lights in said first multitude of lights and the certain lights in said second multitude of lights are pressed they go off.

3. The system of claim 1 further comprising a step of sending one or more electrical activations pursuant to said electrical system to a flight data recorder.

4. The system of claim 1 further comprising a step of providing a test button which, when said test button is pressed, causes said power busses to send power to said first multitude of lights and said second multitude of lights.

5. The system of claim 1 further comprising a step of connecting said electrical system to said multi-engine aircraft's existing external engine input to activate said electrical system.

6. The system of claim 1 further comprising a step of connecting said electrical system to said multi-engine aircraft's existing external fire detection indication to activate said electrical system.

7. The system of claim 1 further comprising a step of providing that certain of said first multitude of lights and certain of said second multitude of lights are red.

8. The system of claim 1 further comprising a step of providing that certain of said first multitude of lights and certain of said second multitude of lights are amber.

* * * * *